United States Patent
Lin

(10) Patent No.: US 8,750,318 B2
(45) Date of Patent: Jun. 10, 2014

(54) METHOD, APPARATUS AND SYSTEM FOR APPLYING RELATIONS BETWEEN PACKAGE BASE AND EXTENSION

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 582 days.

(21) Appl. No.: 12/894,585

(22) Filed: Sep. 30, 2010

(65) Prior Publication Data

US 2011/0019680 A1  Jan. 27, 2011

Related U.S. Application Data

(63) Continuation of application No. PCT/CN2009/070968, filed on Mar. 24, 2009.

(30) Foreign Application Priority Data

Apr. 1, 2008 (CN) .......................... 2008 1 0066434

(51) Int. Cl.
   *H04L 12/28* (2006.01)
(52) U.S. Cl.
   USPC .......................................................... 370/401
(58) Field of Classification Search
   None
   See application file for complete search history.

(56) References Cited

U.S. PATENT DOCUMENTS

| 7,257,111 | B2 | 8/2007 | Groves et al. | |
|---|---|---|---|---|
| 2003/0009337 | A1* | 1/2003 | Rupsis | 704/260 |
| 2006/0114868 | A1* | 6/2006 | Park | 370/338 |
| 2008/0259814 | A1 | 10/2008 | Lin | |

FOREIGN PATENT DOCUMENTS

| CN | 1550120 | 11/2004 |
|---|---|---|
| CN | 1784034 | 12/2004 |
| CN | 1801808 | 7/2006 |
| CN | 1855896 | 11/2006 |
| CN | 1992706 | 7/2007 |
| CN | 101087275 | 12/2007 |
| CN | 101166179 | 4/2008 |

(Continued)

OTHER PUBLICATIONS

Series H: Audiovisual and Multimedia Systems, Infrastructure of audiovisual services—Communication procedures, Gateway control protocol: Version 3, ITU-T H.248.1, Sep. 2005, pp. 1-195.

(Continued)

Primary Examiner — Minh-Trang Nguyen
(74) Attorney, Agent, or Firm — Staas & Halsey LLP

(57) ABSTRACT

A method, an apparatus, and a system for applying relations between a package base and a package extension are disclosed herein. The method includes: A Media Gateway Controller (MGC) delivers an audit command request to a Media Gateway (MG), where the audit command request carries a package extension information property indicating audit of base-extended relationships of packages supported by the MG; the MGC receives an audit command response returned by the MG, where the audit command response carries the base-extended relationships of the packages supported by the MG; the MGC applies the packages according to the base-extended relationships of the packages supported by the MG; the MG receives a command request delivered by the MGC, where the command request carries a package extension information property whose value is the base-extended relationships of packages supported by the MGC; and the MG applies the packages according to the base-extended relationships of the packages supported by the MGC.

5 Claims, 3 Drawing Sheets

(56) References Cited

FOREIGN PATENT DOCUMENTS

| CN | 101179784 | 5/2008 |
|---|---|---|
| CN | 101552713 | 4/2011 |
| EP | 1742436 | 1/2007 |
| WO | 02/058430 | 7/2002 |
| WO | 2005/025143 | 3/2005 |
| WO | 2007/065319 | 6/2007 |

OTHER PUBLICATIONS

International Search Report, mailed Jul. 2, 2009, in corresponding International Application PCT/CN2009/070968 (4 pp.).

Chinese Office Action issued Dec. 24, 2010 in corresponding Chinese Patent Application No. 200810066434.6 (3 pages) (4 pages English Translation).

Written Opinion of the International Searching Authority, mailed Jul. 2, 2009, in International Application No. PCT/CN2009/070968 (3 pp.).

* cited by examiner

METHOD, APPARATUS AND SYSTEM FOR APPLYING RELATIONS BETWEEN PACKAGE BASE AND EXTENSION

CROSS-REFERENCE TO RELATED APPLICATIONS

This application is a continuation of International Application No. PCT/CN2009/070968, filed on Mar. 24, 2009, which claims priority to Chinese Patent Application No. 200810066434.6, filed on Apr. 1, 2008, both of which are hereby incorporated by reference in their entireties.

FIELD OF THE INVENTION

The present invention relates to communication technologies, and in particular, to a technology for controlling publishing and application of packages based on a (media) gateway control protocol.

BACKGROUND OF THE INVENTION

A Media Gateway Controller (MGC) and a Media Gateway (MG) are two key components of a packet-switched network in an architecture where the service is separated from the bearer. The MGC is responsible for the service control function, and the MG is responsible for the media bearing function. In this way, the service control plane is separated from the media bearer plane, network resources are shared sufficiently, device upgrade and service extension are simplified, and the costs of development and maintenance are slashed.

The (media) gateway control protocol is a main protocol for communication between the MG and the MGC. Currently, two commonly used gateway control protocols are H.248/MeGaCo and Media Gateway Control Protocol (MGCP). The interaction operations between the MGC and the MG are performed through command requests and replies in the (media) gateway control protocol. Command parameters, also known as descriptors, are categorized into property, signal, event, and statistic. Service-dependent parameters aggregate into a package logically.

A package represents functions specific to a service or combination of the functions. With the development of services, the functions are enhanced or extended, and accordingly, the package needs to be enhanced or extended. Therefore, the package extending mechanism stipulates that a new package may be derived from an existing package. The existing package is called a base package, and the derived new package is called an extended package. Package elements of a base package include: property, signal, event, statistic, and the corresponding procedure, which are all inherited by the extended package.

In the process of developing the present invention, the inventor finds at least the following problems in the prior art:

In order to facilitate the MGC to control the MG, the MG needs to publish the packages supported by the MG. The MG may choose whether to publish the corresponding base package when publishing the supported extended package to the MGC. In the prior art, the MGC can apply the base package to the control interface between the MGC and the MG only if the MG has published the base package. If the MG has not published the base package, the MGC can apply the extended package but cannot apply the base package.

SUMMARY OF THE INVENTION

The embodiments of the present invention provide a method, an apparatus, and a system for applying relations between a package base and a package extension to solve the contradiction of publishing and applying a package on a control interface between the MGC and the MG in the existing mechanism.

A method for applying relations between a package base and a package extension in an embodiment of the present invention includes:

by an MGC, delivering an audit command request to an MG, where the audit command request carries a package extension information property indicating audit of base-extended relationships of packages supported by the MG;

receiving an audit command response returned by the MG, where the audit command response carries the base-extended relationships of the packages supported by the MG; and applying the packages according to the base-extended relationships of the packages supported by the MG.

A method for applying relations between a package base and a package extension includes:

by an MG, receiving a command request delivered by an MGC, where the command request carries a package extension information property whose value is base-extended relationships of packages supported by the MGC; and applying the packages according to the base-extended relationships of the packages supported by the MGC.

An MGC includes:

a sending unit, adapted to: send a command request for auditing a package extension information property, where the command request carries the package extension information property indicating audit of base-extended relationships of packages supported by the MG; or send a command request for setting the package extension information property whose value is base-extended relationships of packages supported by the MGC;

a receiving unit, adapted to: receive a command response that comes from the MG and corresponds to the command request, where the command response corresponding to the audit command request carries the base-extended relationships of the packages supported by the MG; and a processing unit, adapted to apply the packages according to the base-extended relationships of the packages supported by the MG.

An MG includes:

a receiving unit, adapted to: receive a command request for auditing a package extension information property from an MGC, where the command request carries the package extension information property indicating audit of base-extended relationships of packages supported by the MG; or receive from the MGC a command request for setting the package extension information property whose value is base-extended relationships of packages supported by the MGC;

a processing unit, adapted to: add the base-extended relationships of the packages supported by the MG into a command response returned to the MGC, or apply the packages according to the base-extended relationships of the packages supported by the MGC; and a sending unit, adapted to send a command response corresponding to the command request to the MGC.

A system for applying relations between a package base and a package extension includes:

an MGC, adapted to: send a command request for auditing a package extension information property, where the command request carries the package extension information property indicating audit of base-extended relationships of packages supported by the MG; or send a command request for setting the package extension information property whose value is base-extended relationships of packages supported by the MGC; receive a command response that comes from the MG and corresponds to the command request, where the command response corresponding to the audit command request carries the base-extended relationships of the packages supported by the MG; receive a command response that comes from the MG and corresponds to the command request, where the command response corresponding to the audit command request carries the base-extended relationships of the packages supported by the MG; and apply the packages according to the base-extended relationships of the packages supported by the MG; and an MG, adapted to: receive a command request for auditing a package extension information property from an MGC, where the command request carries the package extension information property indicating audit of base-extended relationships of packages supported by the MG; or receive from the MGC a command request for setting the package extension information property whose value is base-extended relationships of packages supported by the MGC; add the base-extended relationships of the packages supported by the MG into a command response returned to the MGC, or apply the packages according to the base-extended relationships of the packages supported by the MGC; and send a command response corresponding to the command request to the MGC.

Through the method, the apparatus and the system for applying relations between a package base and a package extension in an embodiment of the present invention, the MGC delivers to the MG an audit command request that carries a package extension information property indicating audit of base-extended relationships of packages supported by the MG; the MGC receives from the MG an audit command response that carries the base-extended relationships of packages supported by the MG; and the MGC applies the packages according to the base-extended relationships of the packages. The MG receives a command request delivered by the MGC, where the command request carries a package extension information property whose value is base-extended relationships of packages supported by the MGC; and the MG applies the packages according to the base-extended relationships of the packages supported by the MGC. The MGC understands the base-extended relationships of the packages supported by the MG, and the MG understands the base-extended relationships of the packages supported by the MGC, thus solving the contradiction of publishing and applying the base packages and the extended packages on the control interface between the MGC and the MG.

DETAILED DESCRIPTION OF THE EMBODIMENTS

In order to make the technical solution of the present invention clearer, the following describes the embodiments of the present invention in more detail with reference to accompanying drawings.

Figure 1:
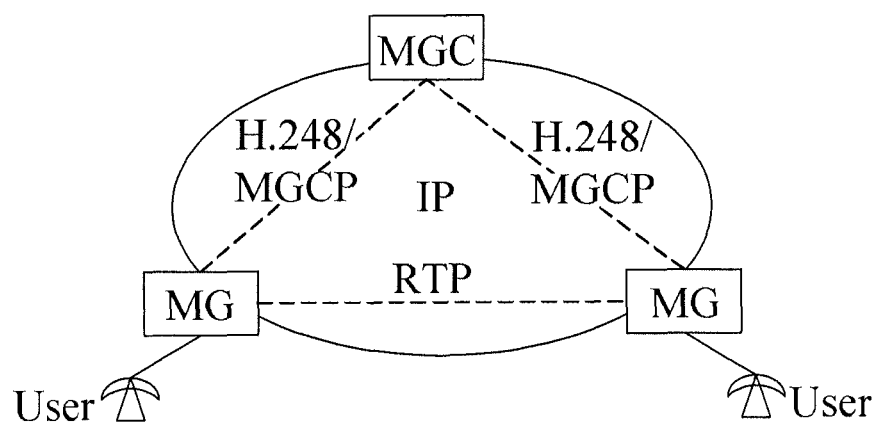
FIG. 1 shows a networking diagram of an MG and an MGC applied in an embodiment of the present invention.

FIG. 1 shows a networking diagram of an MG and an MGC applied in an architecture where the service is separated from the bearer in an embodiment of the present invention.

The (media) gateway control protocol is a main protocol for communication between the MG and the MGC. Currently, two commonly used gateway control protocols are H.248/MeGaCo and Media Gateway Control Protocol (MGCP).

Taking the H.248 protocol as an example, various resources on the MG are abstractly expressed as terminations, which are also known as individual terminations. Terminations are categorized into physical termination and ephemeral termination. A physical termination represents a physical entity of semi-permanent existence, for example, Time Division Multiplex (TDM) timeslots; and an ephemeral termination represents a public resource released after the resource is requested for temporary use and released after the use, for example, Real-Time Transport Protocol (RTP) streams. A special termination called "root termination" represents the entirety of the MG Correlations between terminations are abstractly expressed as context. A context may include multiple terminations. Therefore, relations between terminations are depicted by topology. A termination not correlated with any other termination is included in a special context called "null".

Based on the foregoing abstract connection model, the interactions between the service and the bearer are essentially operations for the termination and the context. Such operations are performed through command requests and replies exchanged between the MGC and the MG. The types of commands include: Add, Modify, Subtract, Move, AuditValue, AuditCapabilities, Notify, and ServiceChange. Command parameters, also known as descriptors, are categorized into property, signal, event, and statistic. In order to facilitate operations, service-dependent parameters aggregate into a package logically.

The control exercised by the MGC to the MG may be intended for a termination or the stream on the termination. A TerminationState descriptor covers the features not specific to streams on the termination, for example, ServiceState, and EventBufferControl. A Media descriptor covers the features specific to streams on the termination. A Media descriptor includes a series of Stream descriptors. Each Stream descriptor is intended for a single stream, and includes these descriptors: LocalControl, Local, and Remote. A LocalControl descriptor includes stream-related control information, for example, Mode, ReserveGroup, and ReserveValue. The Local descriptor covers the features of the streams received locally, and the Remote descriptor covers the features of the streams received remotely, for example, address, port, and codec algorithm, which are expressed through Session Description Protocol (SDP).

Therefore, in order for the MGC to control the MG to apply the base package and the extended package, the (media) gateway control protocol needs to be extended first. The present invention is elaborated below with reference to several preferred embodiments.

First Embodiment

This embodiment uses a property to represent the base-extended relationship of the packages, and the publishing state. This property may be defined in an existing package or a new package, and is expressed in the "package identifier/property identifier" format. For example, the new package is named as "Package Identifier Publishing and Application (abbreviated as PIPA) package", the property is named as "Package Extension Information (abbreviated as PEI)", and the property is expressed in the "pipa/pei" format, as detailed below.

This property may be intended for the root termination representative of the entirety of the MG, or for individual termination in the MG, and is applied in the TerminationState descriptor. The type of this property is Sub-list of String. Each element in the sub-list represents extension information of a package, including base package name, optional extended package name, and optional publishing state. The package name is composed of a package identifier and an optional version. If the extended package name does not appear, it indicates that the package corresponding to the base package name is an independent package. The publishing state may be "Both" indicating that both the base package and the extended package are published, or "Ext" indicating that only the base package is published and the extended package is not published. If the publishing state does not appear, the value "Both" applies. If the version does not appear, version 1 applies.

For example, the format is "base package name [:extended package name][:publishing state]", where: the "base package name" and the "extended package name" are in the "package identifier-version" format; "[ . . . ]" indicates optional content; "nt" indicates that the package is an independent package and is published; "nt:rtp:both" indicates that the rtp is an extended package corresponding to the base package "nt", and both rtp and nt are published; and "nt: tdmc:ext" indicates that tdmc is an extension corresponding to the base package "nt", and only tdmc is published.

When the MGC needs to understand the base-extended relationship of packages supported by the MG as well as the publishing state, the MGC audits the foregoing PEI property on the MG. The MGC may use an AuditValue command to audit the whole MG represented by the root termination or an individual termination in the MG. Afterward, the corresponding audit response returned by the MG to the MGC carries the base-extended relationship of the packages supported by the MG, and the state of publishing the packages. Therefore, the MGC can process the package identifier carried in the message from the MG according to such information.

Besides, when the MGC needs to let the MG understand the base-extended relationship of packages supported by the MGC as well as the publishing state, the MGC sets the foregoing PEI property and sends it to the MG. The MGC may use a command such as Add, Move, Modify, and Subtract to set the whole MG represented by the root termination or an individual termination in the MG. In this way, the MG can process the package identifier carried in the message from the MGC according to such information.

With the PEI property audited and set by the MGC, the MGC understands the base-extended relationships of the packages supported by the MG, and the MG understands the base-extended relationships of the packages supported by the MGC.

Figure 2:
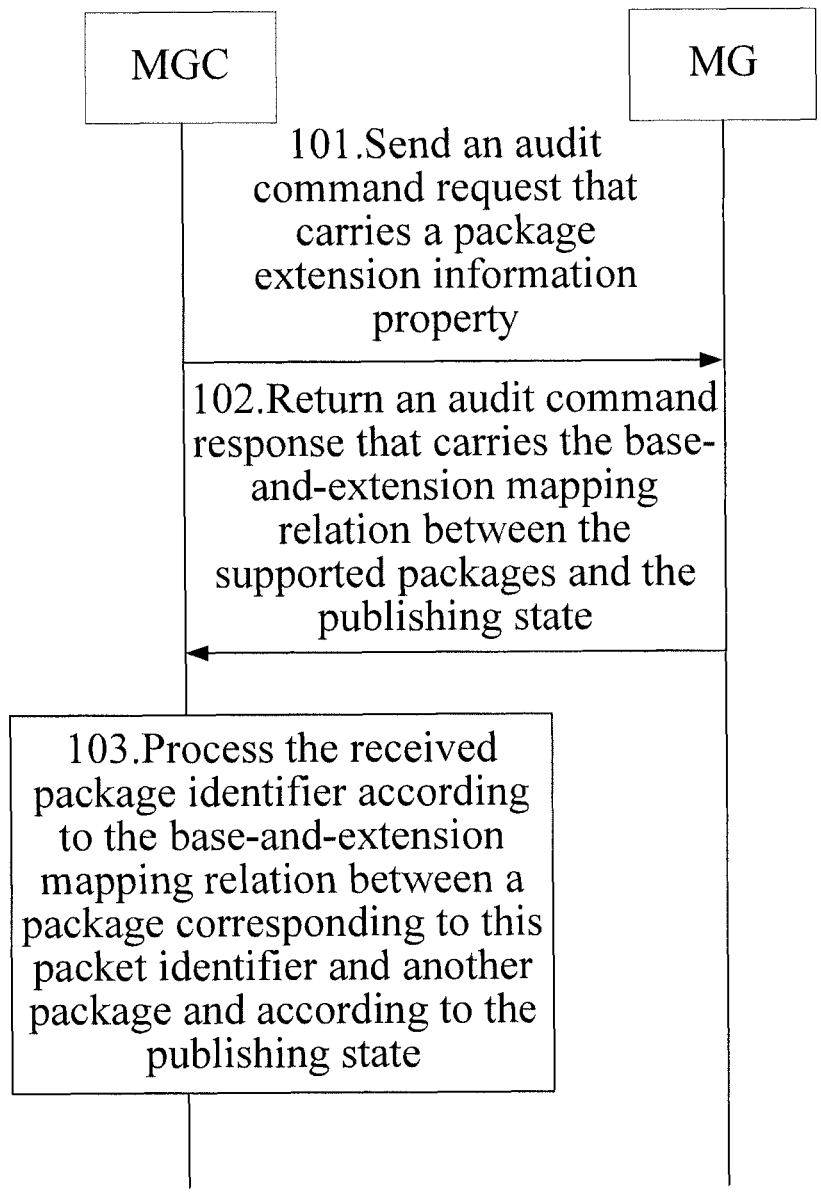
FIG. 2 is a flowchart of the first embodiment of the present invention.

FIG. 2 is a flowchart of the first embodiment of the present invention, which includes the following steps:

Step 101: The MGC sends an audit command request to the MG. The audit command request is intended for the specific terminations on the MG, and carries a package extension information property indicating audit of the base-extended relationship of the packages supported by the MG on this termination as well as the publishing state.

The MGC may send the audit to the MG through an AuditValue command that carries the package extension information property. This termination may be a root termination representative of the whole MG, or an individual termination in the MG.

Step 102: The MG returns an audit command response to the MGC. A value of the package extension information property in the audit command response carries the base-extended relationship of the packages supported by the MG, and the state of publishing the packages.

The type of this property is Sub-list of String. Each element in the sub-list represents extension information of a package, including base package name, optional extended package name, and optional publishing state. The package name is composed of a package identifier and an optional version. For example, the format is "base package name [:extended package name][:publishing state]", where: the "base package name" and the "extended package name" are in the "package identifier-version" format; "[ . . . ]" indicates optional content. If the extended package name does not appear, it indicates that the package corresponding to the base package name is an independent package. The publishing state may be "Both" indicating that both the base package and the extended package are published, or "Ext" indicating that only the base package is published and the extended package is not published. If the publishing state does not appear, the value "Both" applies. If the version does not appear, version 1 applies.

When the foregoing audit command response publishes the relations between the packages supported by the MG, the corresponding package identifier represents such packages. Therefore, the audit command response is equivalent to: The MG publishes the packages supported by the MG to the MGC.

Step 103: The MGC performs the corresponding operations for the package identifier carried in the message received from the MG. The operations are based on the base-extended relationship of a package corresponding to this packet identifier and another package, and the state of publishing the packages, where the mapping relation is obtained from the package extension information.

Here is an example: A is a base package, and B is an extended package. For package element a of A: if the MG has published both A and B, the MGC can accept the MG using A/a or B/a to cite a so long as A is applied; if MG publishes only B, the MGC accepts the MG using B/a to cite a so long as A is applied. The MGC accepts the MG using B/a to cite a so long as A is applied even if B is not applied because the MGC knows that B/a is A/a according to the base-extended relationship of the packages.

In this embodiment, a package identifier is used when the MG reports the base-extended relationship of packages to the MGC, which is equivalent to the effect that the MG publishes the identifier of the supported package to the MGC. Therefore, the MGC can perform subsequent operations correctly according to the packages published by the MG and the base-extended relationship of the packages.

Second Embodiment

Figure 3:
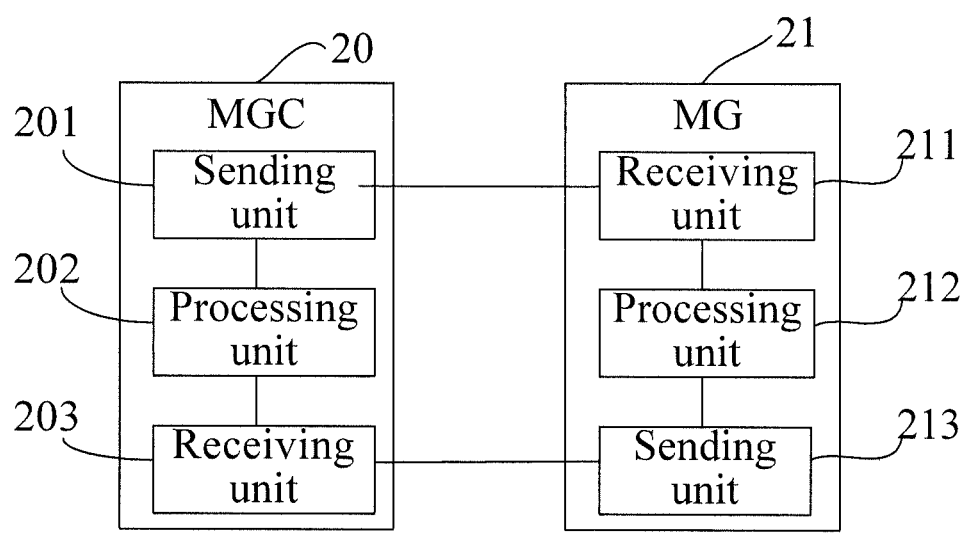
FIG. 3 shows a system structure of the second embodiment of the present invention.

This embodiment provides a system for controlling application of the base package and the extended package. As shown in FIG. 3, the system in this embodiment includes an MGC 20 and an MG 21. The MGC 20 includes a sending unit 201, a processing unit 202, and a receiving unit 203; and the MG includes a receiving unit 211, a processing unit 212, and a sending unit 213.

The sending unit 201 of the MGC 20 is adapted to: send a command request for auditing a package extension information property to the MG 21, where the command request may be an AuditValue command and the command request carries the package extension information property indicating audit of base-extended relationships of packages supported by the MG; or send a command request for setting the package extension information property whose value is base-extended relationships of packages supported by the MGC, where the command request may be Add, Move, Modify, or Subtract.

The receiving unit 203 of the MGC 20 is adapted to receive a command response that comes from the MG 21 and corresponds to the command request, where the command response corresponding to the audit command request carries the base-extended relationships of the packages supported by the MG. The processing unit 202 is adapted to apply the packages according to the base-extended relationships of the packages supported by the MG 21.

The receiving unit 211 of the MG 21 is adapted to receive the command request from the MGC 20. The processing unit 212 of the MG 21 is adapted to: add the base-extended relationships of the packages supported by the MG into a command response returned to the MGC 20, or apply the packages according to the base-extended relationships of the packages supported by the MGC 20. The sending unit 213 of the MG 21 is adapted to send a command response corresponding to the command request to the MGC 20.

In this embodiment, the MGC understands the base-extended relationships of the packages supported by the MG, and the MG understands the base-extended relationships of the packages supported by the MGC, thus solving the contradiction of applying the base packages and the extended packages on the control interface between the MGC and the MG.

After reading the foregoing embodiments, those skilled in the art are clearly aware that the present invention may be implemented through hardware, or through software in addition to a necessary universal hardware platform. The technical solution under the present invention may be embodied as a software product. The software product may be stored in a non-volatile storage medium (such as CD-ROM, USB flash disk, or mobile hard disk), and may incorporate several instructions that enable a computer device (such as personal computer, server, or network device) to perform the method specified in any embodiment of the present invention.

The above descriptions are merely preferred embodiments of the present invention, but are not intended to limit the scope of the present invention. Any modification, equivalent replacement, or improvement made without departing from the spirit and principles of the present invention shall fall within the scope of the present invention.

What is claimed is:

1. A system for applying relations between a package base and a package extension, comprising: a Media Gateway Controller (MGC) and a Media Gateway (MG), wherein
the MGC comprises:
    a sending unit, adapted to send a command request for auditing a package extension information property, wherein the command request carries the package extension information property indicating audit of relationships between base packages and the extended packages as base-extended relationships of packages supported by the MG; or send a command request for setting the package extension information property whose value is for setting relationships between the base packages and the extended packages as base-extended relationships of packages supported by the MGC;
    a receiving unit, adapted to receive a command response that comes from the MG and corresponds to the command request; and
    a processing unit, adapted to apply the packages according to the base-extended relationships of the packages supported by the MG;
the MG comprises:
    a receiving unit, adapted to receive a command request for auditing a package extension information property from the MGC, wherein the command request carries the package extension information property indicating audit of base-extended relationships of packages supported by the MG; or receive from the MGC a command request for setting the package extension information property whose value is base-extended relationships of packages supported by the MGC;
    a processing unit, adapted to add the base-extended relationships of the packages supported by the MG into a command response returned to the MGC, or apply the packages according to the base-extended relationships of the packages supported by the MGC; and
    a sending unit, adapted to send a command response corresponding to the command request to the MGC.

2. The system according to claim 1, wherein:
the package extension information property is intended for a specific termination on the MG, and the specific termination is a root termination representative of the whole MG, or the specific termination is an individual termination in the MG.

3. The system according to claim 1, wherein the package extension information property comprises:
base package name, optional extended package name, and optional publishing state.

4. The system according to claim 3, wherein:
the base package name and the extended package name are composed of a package identifier and an optional version.

5. The system according to claim 3, wherein:
a value of the publishing state indicates that both the base package and the extended package are published, or indicates that only the extended package is published.

* * * * *